United States Patent

Imamura

(10) Patent No.: US 8,963,864 B2
(45) Date of Patent: Feb. 24, 2015

(54) MOBILE TERMINAL AND EDITING CONTROLLING METHOD

(71) Applicant: KYOCERA Corporation, Kyoto, Kyoto (JP)

(72) Inventor: Hitoshi Imamura, Nishinomiya (JP)

(73) Assignee: KYOCERA Corporation, Kyoto (JP)

( * ) Notice: Subject to any disclaimer, the term of this patent is extended or adjusted under 35 U.S.C. 154(b) by 111 days.

(21) Appl. No.: 13/712,335

(22) Filed: Dec. 12, 2012

(65) Prior Publication Data

US 2013/0147708 A1    Jun. 13, 2013

(30) Foreign Application Priority Data

Dec. 13, 2011 (JP) ................. 2011-271871

(51) Int. Cl.
| G06F 3/041 | (2006.01) |
| G06F 17/24 | (2006.01) |
| G06F 3/0488 | (2013.01) |

(52) U.S. Cl.
CPC .............. G06F 3/041 (2013.01); G06F 17/24 (2013.01); G06F 3/04883 (2013.01)
USPC ................. 345/173; 178/18.01; 178/19.01; 715/863

(58) Field of Classification Search
CPC ...... G06F 3/041; G06F 3/04883; G06F 17/24
USPC .................. 178/18.01–19.07; 345/173–178; 715/863
See application file for complete search history.

(56) References Cited

U.S. PATENT DOCUMENTS

| 7,030,861 B1 * | 4/2006 | Westerman et al. .......... 345/173 |
| 2010/0031203 A1 * | 2/2010 | Morris et al. ................. 715/863 |
| 2010/0235770 A1 * | 9/2010 | Ording et al. ................ 715/765 |

FOREIGN PATENT DOCUMENTS

JP    H10-097531 A    4/1998

* cited by examiner

*Primary Examiner* — Michael Pervan
(74) *Attorney, Agent, or Firm* — Procopio, Cory, Hargreaves & Savitch LLP

(57) ABSTRACT

A mobile phone includes a display provided with a touch panel. If a memo pad function is performed, a document and a cursor which indicates an editing position are displayed on the display. If a pinch out operation is made by two fingers in a state that a character is being displayed, the character being displayed on the display is enlarged. In such a state, if a third finger touches the touch panel between the two fingers, a cursor position is changed based on a touch position of a touch by the third finger.

7 Claims, 9 Drawing Sheets

FIG. 9
(A) 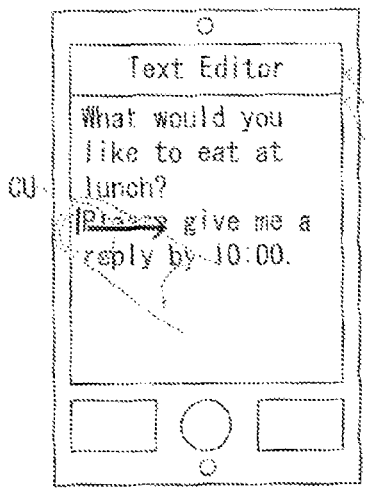
(B) 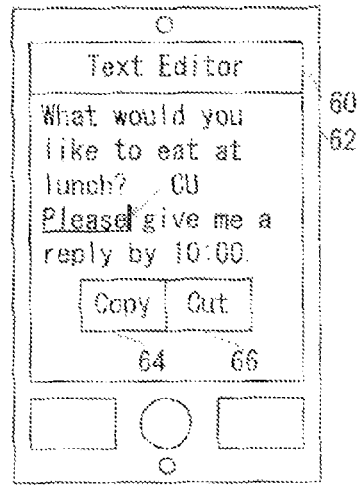
(C) 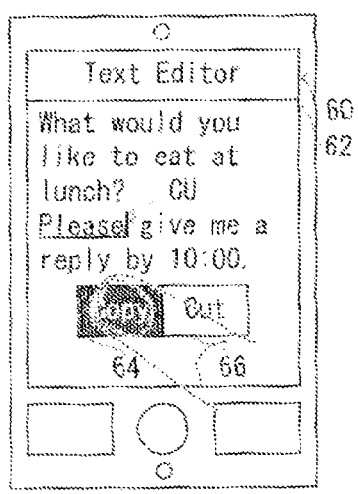

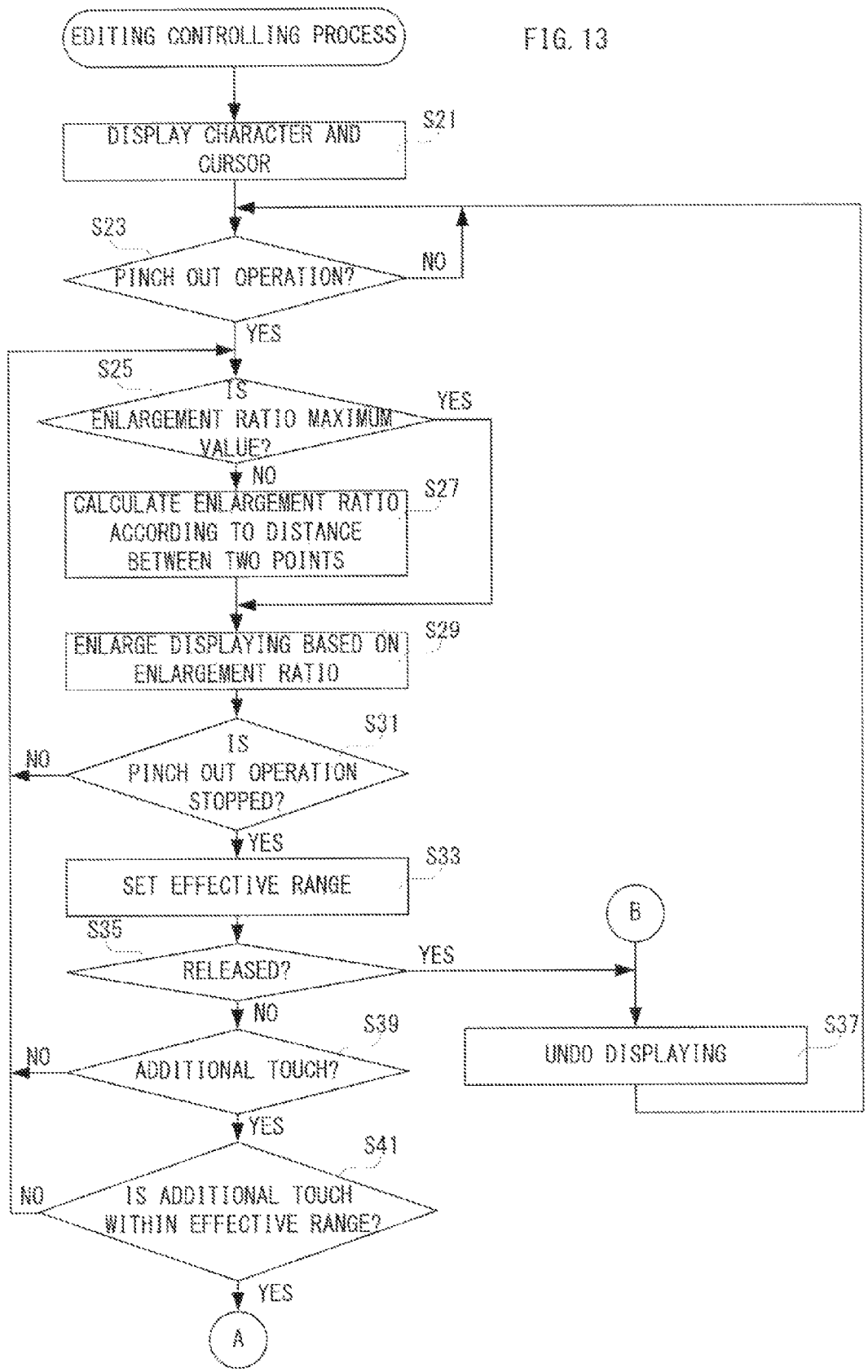

MOBILE TERMINAL AND EDITING CONTROLLING METHOD

CROSS REFERENCE OF RELATED APPLICATION

The disclosure of Japanese Patent Application No. 2011-271871 is incorporated herein by reference.

BACKGROUND OF THE INVENTION

1. Field of the Invention

The present invention relates to a mobile terminal and an editing controlling method, and more specifically, a mobile terminal operated by using a touch panel, and an editing controlling method.

2. Description of the Related Art

An example of a mobile terminal operated by using a touch panel is disclosed in Japanese Patent Application Laying-Open No. H10-97531 [G06F 17/24, G06F 17/22, G06F 17/21] laid-open on Apr. 14, 1998. In a document editing apparatus in this related art, a character written with a handwritten character inputting pen is recognized, and a character corresponding to a recognition result is displayed. Furthermore, if a user touches a position on a displaying screen at which the user wishes to insert a character by the pen, the position is detected by a touch panel on a front surface of the screen, and a cursor is displayed.

In a case that the document editing apparatus of the related art is applied to a mobile phone, there is a possibility that a position at which the user wishes to insert a character is touched by a finger instead of the hand-written character inputting pen. Since a displaying screen of the mobile phone is small, even if the user touches the inserting position by the finger, a displaying position of the cursor is not properly changed in some cases.

SUMMARY OF THE INVENTION

Therefore, it is a primary object of the present invention to provide a novel mobile terminal and an editing controlling method.

Another object of the present invention is to provide a mobile terminal and an editing controlling method, in that an editing of a character is easy to be performed.

A first aspect according to the present invention is a mobile terminal having a display which displays a cursor, a touch panel provided on the display and a detecting module which detects a touch operation with respect to the touch panel, comprising: a calculating module which calculates an enlargement ratio according to an enlarging operation in a state that the enlarging operation is being performed with respect to the touch panel; an enlarging module which enlarges a displaying by the display based on the enlargement ratio; a first determining module which determines whether or not a further touch operation is performed in a state that the displaying by the display is being enlarged; a second determining module which determines whether or not the further touch operation satisfies a predetermined condition when it is determined by the first determining module that the further touch operation is performed; and a changing module which changes a cursor position of the cursor in response to the further touch operation satisfying the predetermined condition when it is determined that the further touch operation satisfying the predetermined condition is performed.

A second aspect according to the present invention is an editing controlling method of a mobile terminal having a display which displays a cursor, a touch panel provided on the display and a detecting module which detects a touch operation with respect to the touch panel, comprising steps of: calculating an enlargement ratio according to an enlarging operation in a state that the enlarging operation is performed with respect to the touch panel; enlarging a displaying by the display based on the enlargement ratio; determining whether or not a further touch operation is performed in a state that the displaying is being enlarged; determining whether or not the further touch operation satisfies a predetermined condition when it is determined that the further touch operation is performed; and changing a cursor position of the cursor in response to the further touch operation satisfying the predetermined condition when it is determined that the further touch operation satisfying the predetermined condition is made.

A third aspect according to the present invention is a mobile terminal having a display which displays a cursor, a touch panel provided on the display and a detecting module which detects a touch operation with respect to the touch panel, comprising: a calculating module which calculates an enlargement ratio according to an enlarging operation in a state that the enlarging operation is performed with respect to the touch panel; an enlarging module which enlarges a displaying by the display based on the enlargement ratio; and an undoing module which undoes the displaying by the display when the touch operation with respect to the touch panel becomes not to be detected in a state that the displaying by the display is being enlarged.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 8 are illustrative views showing an example of an operation that a line feed is added to the document being displayed on the display shown in FIG. 1, wherein FIG. 8(A) shows an example of an operation starting a new line after the document being displayed is enlarged, and FIG. 8(B) shows a displaying example of the whole document in which a new line is started.

FIG. 9 are illustrative views showing an example of an operation storing a part of the document which is displayed on the display shown in FIG. 1, wherein FIG. 9(A) shows an example of an operation selecting a character, FIG. 9(B) shows a displaying example of a copying key and a pasting key, and FIG. 9(C) shows an example of an operation for the copying key shown in FIG. 9(B).

FIG. 13 is a flowchart showing an example of a part of an editing controlling process by the processor shown in FIG. 2.

FIG. 15 are illustrative views showing another example of an operation that a line feed is added to the document being displayed on the display shown in FIG. 1, wherein FIG. 15(A) shows a displaying example of a plurality editing keys, FIG. 15(B) shows an example of an operation selecting one key out of the plurality of editing keys, and FIG. 15(C) shows a displaying example of a state that a new line is inserted to the document displayed on the display.

DETAILED DESCRIPTION OF THE PREFERRED EMBODIMENTS

First Embodiment

Figure 1:
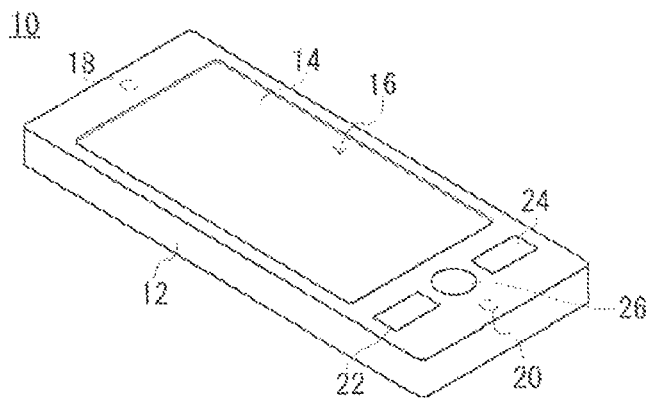
FIG. 1 is an appearance view showing a mobile phone of an embodiment according to the present invention.

With referring to FIG. 1, a mobile phone 10 of an embodiment according to the present invention is a smartphone as an example, and includes a longitudinal flat rectangular housing 12. However, it is pointed in advance that the present invention can be applied to an arbitrary mobile terminal such as a tablet terminal, a PDA, etc.

A display 14 such as a liquid crystal, organic EL or the like, which functions as a display module is provided on a main surface (front surface) of the housing 12. A touch panel 16 is provided on the display 14. Therefore, in the mobile phone 10 of this embodiment shown, the most of input operations except an operation through a hard key described later are performed through the touch panel 16.

A speaker 18 is housed in the housing 12 at one end of a longitudinal direction on a side of the front surface, and a microphone 20 is housed at the other end in the longitudinal direction on the side of the front surface.

As a hard key constituting an inputting module together with the touch panel 16, in this embodiment, a call key 22, an end key 24 and a menu key 26 are provided.

For example, the user can input a telephone number by making a touch operation on the touch panel 16 with respect to a dial key (not shown) displayed on the display 14, and start a telephone conversation by operating the call key 22. If and when the end key 24 is operated, the telephone conversation can be ended. In addition, by long-depressing the end key 24, it is possible to turn-on/-off a power of the mobile phone 10.

If the menu key 26 is operated, a menu screen is displayed on the display 14, and in such a state, by making a touch operation on the touch panel 16 against a soft key, a menu icon (both, not shown) or the like being displayed on the display 14, it is possible to select a menu, and to decide such a selection.

Figure 2:
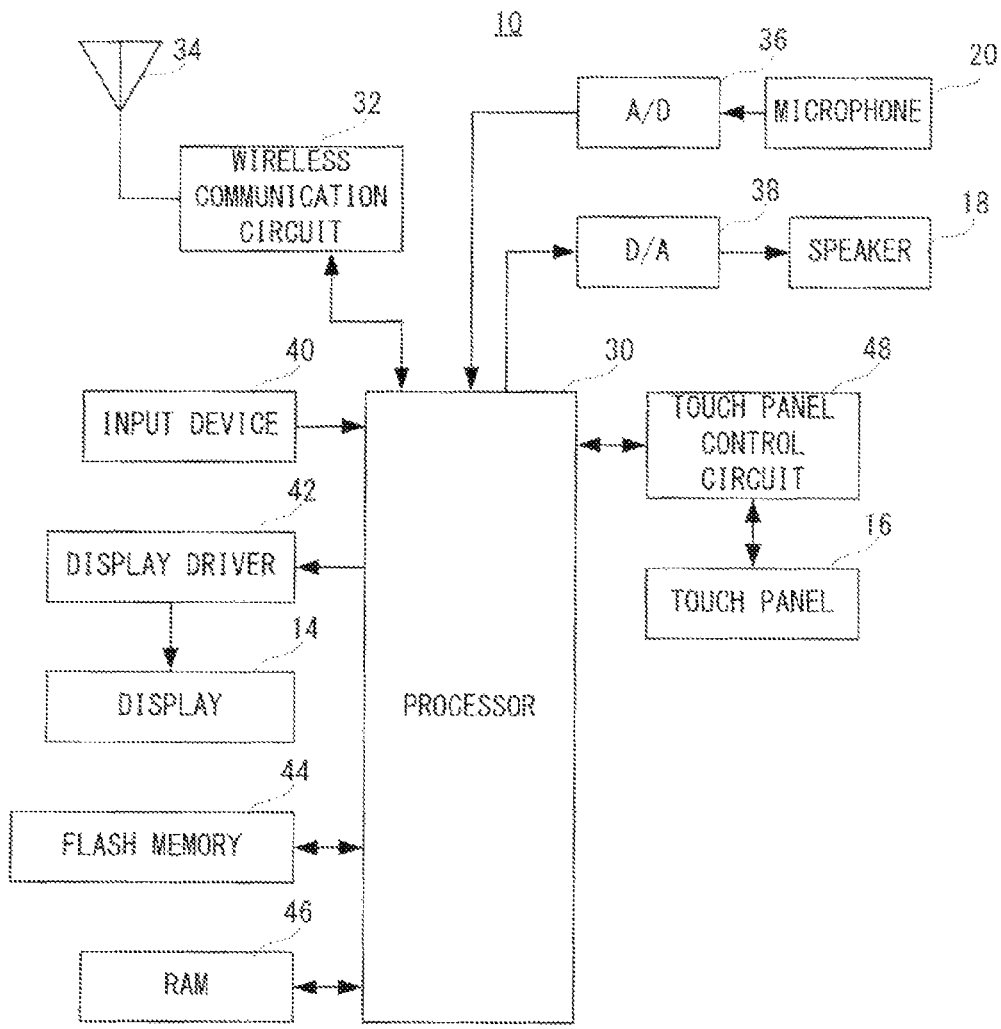
FIG. 2 is an illustrative view showing electrical structure of the mobile phone shown in FIG. 1.

With referring to FIG. 2, the mobile phone 10 of the embodiment shown in FIG. 1 includes a processor 30 called as a computer or a CPU. The processor 30 is connected with a wireless communication circuit 32, an A/D converter 36, a D/A converter 38, an input device 40, a display driver 42, a flash memory 44, a RAM 46, a touch panel control circuit 48, etc.

The processor 30 is in charge of a whole control of the mobile phone 10. All or a part of a program set in advance on the flash memory 44 is, in use, developed into the RAM 46, and the processor 30 operates in accordance with the program in the RAM 46. In addition, the RAM 46 is further used as a working area or buffer area for the processor 30.

The input device 40 includes the touch panel 16 shown in FIG. 1 and the hard keys 22-26, and constitutes an operating module or an inputting module. Information (key data) of the hard key operated by the user is input to the processor 30.

The wireless communication circuit 32 is a circuit for transmitting and receiving a radio wave for a telephone conversation, a mail, etc. via an antenna 34. In this embodiment, the wireless communication circuit 32 is a circuit for performing a wireless communication with a CDMA system. For example, if the user designates a telephone dispatch (telephone call) using the input device 40, the wireless communication circuit 32 performs a telephone call processing under instructions from the processor 30 and outputs a telephone call signal via the antenna 34. The telephone call signal is transmitted to a telephone at the other end of the line through a base station and a communication network. Then, an incoming processing is performed in the telephone at the other end of the line, a communication-capable state is established and the processor 30 performs the telephonic communication processing.

Specifically describing, a normal telephonic communication processing, a modulated sound signal sent from a telephone at the other end of the line is received by the antenna 34. The modulated sound signal received is subjected to a demodulation processing and a decode processing by the wireless communication circuit 32. A received sound signal obtained through such processing is converted into an analog sound signal by the D/A converter 38 to be output from the speaker 18. On the other hand, a sending sound signal taken-in through the microphone 20 is converted into sound data by the A/D converter 36 to be applied to the processor 30. The sound data is subjected to an encode processing and a modulation processing by the wireless communication circuit 32 under instructions by the processor 30 to be output via the antenna 34. Therefore, the modulated sound signal is transmitted to the telephone at the other end of the line via the base station and the communication network.

When the telephone call signal from a telephone at the other end of the line is received by the antenna 34, the wireless communication circuit 32 notifies the processor 30 of the incoming call. In response thereto, the processor 30 displays on the display 14 sender information (telephone number and so on) described in the incoming call notification by controlling the display driver 42. In addition, the processor 30 outputs from the speaker 18 a ringtone (may be also called as a ringtone melody, a ringtone voice).

Then, if the user performs an answering operation by using the call key 22 (FIG. 1), the wireless communication circuit 32 performs a processing for establishing a communication-capable state under instructions by the processor 30. Furthermore, when the communication-capable state is established, the processor 30 performs the above-described telephone communication processing.

If the telephone communication ending operation is performed by the end key 24 (FIG. 1) included in the input device 40 after a state is changed to the communication-capable state, the processor 30 transmits a telephone communication ending signal to the telephone at the other end of the line by controlling the wireless communication circuit 32. Then, after the transmission of the telephone communication ending signal, the processor 30 terminates the telephone communication processing. Furthermore, in a case that the telephone ending signal from the telephone at the other end of the line is received before the telephone communication ending operation at this end, the processor 30 also terminates the telephone communication processing. In addition, in a case that the telephone communication ending signal is received from the mobile communication network not from the telephone at the other end of the line, the processor 30 also terminates the telephone communication processing.

The microphone 20 shown in FIG. 1 is connected to the A/D converter 36, and as described above, a sound signal from the microphone 20 is input to the processor 30 as digital sound signal through the A/D converter 36. The speaker 18 is connected to the D/A converter 38. The D/A converter 38 converts a digital sound signal into an analog sound signal so as to apply to the speaker 18 via an amplifier. Therefore, a sound or voice of the sound data is output from the speaker 18.

In addition, the processor 30 adjusts, in response to an operation of a volume by the user, a sound volume of the sound output from the speaker 18 by controlling an amplification factor of the amplifier connected to the D/A converter 38.

The display driver 42 is connected with the display 14 and a processor 30, and stores the image data output from the processor 30 into the VRAM. The display driver 42 displays on the display 14 the image corresponding to the data stored in the VRAM. That is, the display driver 42 controls a displaying by the display 14 which is connected to the display driver 42 under instructions by the processor 30. In addition, the display 14 is provided with a backlight which includes a light source of an LED or the like, for example, and the display driver 42 controls, according to the instructions of the processor 30, brightness, light-on/off of the backlight.

The touch panel 16 shown in FIG. 1 is connected to a touch panel control circuit 48. The touch panel control circuit 48 applies a necessary voltage, etc. to the touch panel 16, and inputs to the processor 30 a touch start signal indicating a start of a touch by the user, a touch end signal indicating an end of a touch by the user, and coordinates data indicating a touch position where the user touches. Therefore, the processor 30 can determine which icon or key is touched by the user based on the coordinates data.

In the embodiment, the touch panel 16 is of an electrostatic capacitance system that detects a change of an electrostatic capacitance between electrodes, which occurs when an object such as a finger is in close to a surface of the touch panel 16, and it is detected that one or more fingers is brought into contact with the touch panel 16, for example. In addition, the touch panel 16 is a pointing device which is provided on the display 14 and designates an arbitrary position within a screen of the display. The touch panel control circuit 48 functions as a detecting module, and detects a touch operation within a touch-effective range of the touch panel 16, and outputs coordinates data indicative of a position of the touch operation to the processor 30. That is, the user can input an operating position, an operating direction and so on to the mobile phone 10 by touching, sliding and releasing on or from the surface of the touch panel 16.

In addition, for a detection system of the touch panel 16, a surface-type electrostatic capacitance system may be adopted, or a resistance film system, an ultrasonic system, an infrared ray system, an electromagnetic induction system or the like may be adopted. Furthermore, a touch operation is not limited to an operation by a finger, may be performed by a touch pen.

The mobile phone 10 has a memo pad function for editing a document. A user can apply to the document being displayed an editing process such as insertion and deletion processing of a character, line feed processing, copy or cut processing of a character string, paste (insertion) processing of a character string by performing the memo pad function.

Figure 3:
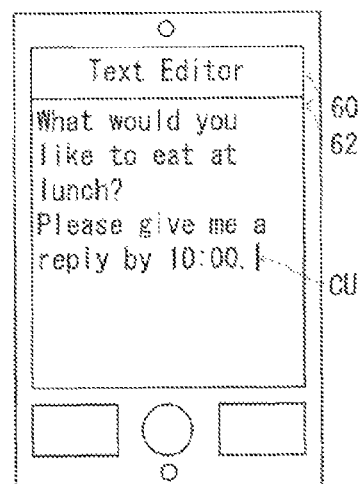
FIG. 3 is an illustrative view showing an example of a document which is displayed on a display shown in FIG. 1.

FIG. 3 is an illustrative view showing an example of a state that the memo pad function for editing the document is performed and thus the document is being displayed on the display 14. With referring to FIG. 3, a displaying range of the display 14 includes a title displaying area 60 and a character displaying area 62. In the title displaying area 60, a name (Text Editor) of a function being performed is included.

In the character displaying area 62, a document and a cursor CU which indicates an editing position are included. The above-described editing processing is executed based on a displaying position of the cursor CU. Then, if the user wishes to change the editing position, it is possible to change a cursor position of the cursor CU by touching the document.

The user can change the cursor position by performing an additional touch operation after a character being displayed is enlarged by a touch operation.

Figure 4:
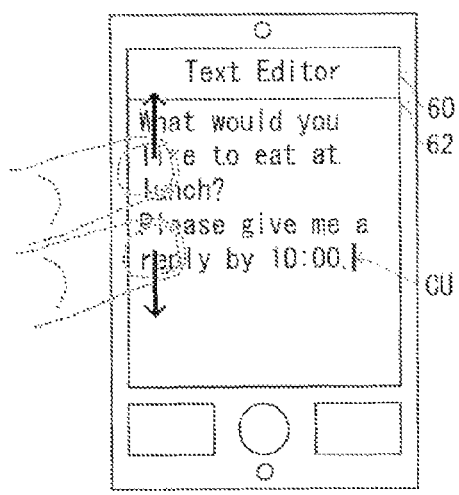
FIG. 4 is an illustrative view showing an example of a touch operation that is performed to a touch panel.
Figure 5:
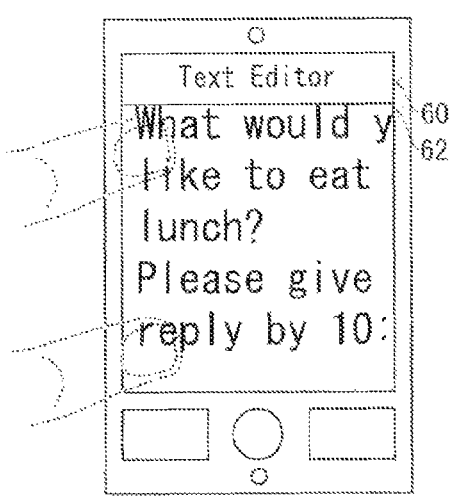
FIG. 5 is an illustrative view showing an example of a state that the document being displayed on the display shown in FIG. 1 is enlarged.

With referring to FIG. 4, after the touch panel 16 is touched with two fingers at the same time or at approximately the same time, if an operation that the two fingers are spread apart (hereinafter, called as "pinch out operation" or "enlarging operation") is performed, an enlargement ratio is calculated in accordance with a change of a distance between the two points. With referring to FIG. 5, based on a calculated enlargement ratio, a displaying of the character displaying area 62 on the display 14 is enlarged. More specifically, the processor 30 designates a range that image data is to be read from the VRAM to the display driver 42 based on a center point of the two touch positions in the pinch out operation and a calculated enlargement ratio. The display driver 42 reads the image data from the VRAM based on a reading range designated by the processor 30. To the read image data, enlarging processing is applied in correspondence to the displaying range of the display 14. Then, an enlarged image (character) is displayed in the character displaying area 62 as shown in FIG. 5. In addition, if the two fingers are released from the touch panel 16, the displaying of the display 14 returns to a state of FIG. 3. That is, the user can undo the displaying only by releasing the finger after the displaying is enlarged.

Next, if the touch position that the touch panel control circuit 48 outputs becomes not to be changed, it is determined that the pinch out operation is stopped. Then, if the pinch out operation is stopped, an effective range in which the additional touch operation (further touch operation) can be accepted is set. The effective range is set based on the positions of the two fingers performing the pinch out operation. That is, a region between the two touch positions is set as the effective range, whereby the cursor position cannot be changed to a position that the user does not intend.

Figure 6:
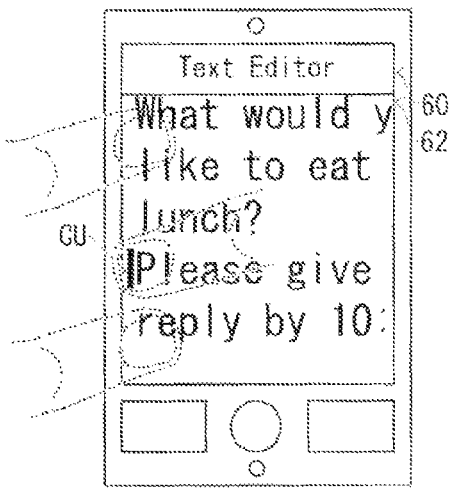
FIG. 6 is an illustrative view showing another example of the touch operation that is performed with respect to the touch panel.
Figure 7:
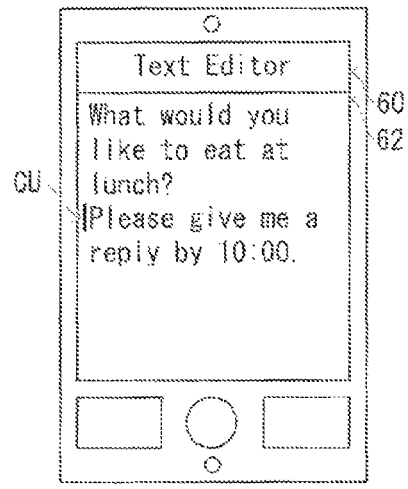
FIG. 7 is an illustrative view showing another example of a document which is displayed on the display shown in FIG. 1.

With referring to FIG. 6, if a third touch position by a third finger is detected within a set effective range, the cursor position is changed based on the touch position. Then, when all fingers are released from the touch panel 16, as shown in FIG. 7, in a state that the cursor position is changed, a displaying size of the character being displayed in the character displaying area 62 is undone.

Therefore, the user can enlarge the character and easily change the cursor position by performing the pinch out operation such that a position to be enlarged is rendered as a center.

Therefore, it becomes easy for the user to perform an edition of the character. Then, the user can confirm a whole document by releasing all fingers from the touch panel 16.

Furthermore, in this embodiment shown, the user can change the cursor position and perform the editing operation such as the line feed, the paste of the character, etc. by setting in advance by the user.

Figure 8:
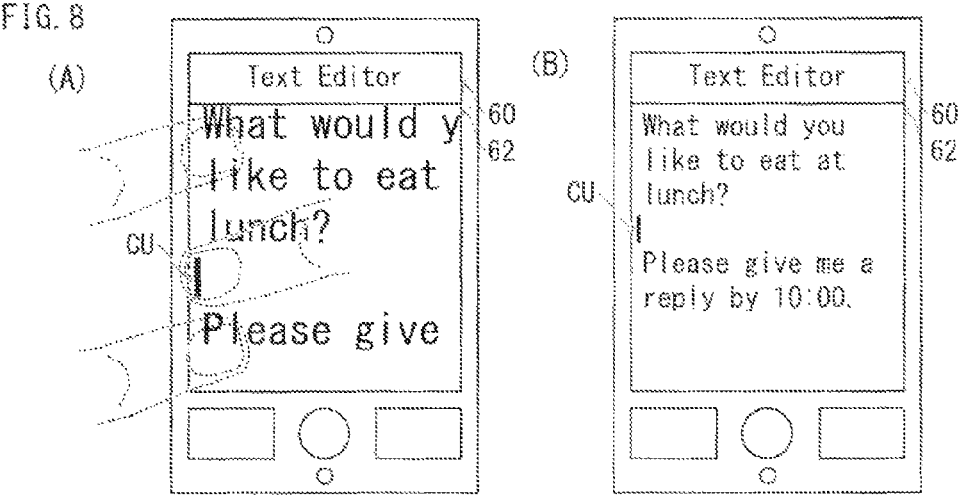

At first, a description is made on the line feed processing performed based on a changed cursor position. With referring to FIGS. 8 (A) and 8(B), if the additional touch operation is performed in a state where a setting is made such that a line feed processing and a change in the cursor position are performed, for example, the cursor position is changed and a new line is started at the character after the cursor CU. Then, if the user releases the finger, the document in which a new line is started is displayed on the display 14 wholly.

Next, a description is made on the paste processing performed based on a changed cursor position. In addition, if the character is to be pasted, the character is to be copied in advance.

With referring to FIGS. 9(A)-9(C), if the finger is moved so as to stroke the displaying of the character after the finger touches the displaying position of the cursor CU, it becomes a state that the character string is selected. That is, the character string included in the cursor displaying position and the touch ending position is underlined. When the character is selected, a copy key 64 for copying the selected character and a cut key 66 for cutting the selected character are displayed.

For example, if the touch operation is applied to the copy key 64, the selected character is stored in the buffer in the RAM 46. If the cut key 66 is touched, the selected character is stored in the buffer of the RAM 46 and the selected character is deleted. In addition, in a case that the user wishes not to temporarily store the selected character and to make the displayed keys unshown, the user may touch to an arbitrary position to which no key is being displayed. Then, the selection of the character is cancelled, and the copy key 64 and the cut key 66 are made unshown.

Figure 10:
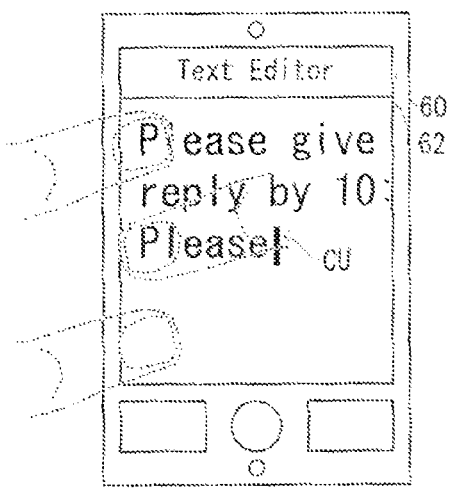
FIG. 10 is an illustrative view showing another example of a touch operation that is performed with respect to the touch panel.

With referring to FIG. 10, if the additional touch operation is performed in a state that the selected character is stored in the buffer and not only the change of the cursor position and the pasting processing are to be performed, a character is inserted based on the touch position, and then, the cursor CU is displayed in a next position following an inserted character string.

Thus, the user can change the cursor position and edit the document. In addition, if the enlargement ratio reaches a maximum value, the displaying of the display 14 becomes not to be enlarged.

It is possible for the user to arbitrarily change the position of the cursor CU by performing a touch operation to an arbitrarily position prior to the displaying is enlarged.

Features of the embodiment shown are outlined in the above, but in the following, this embodiment will be described in detail by using a memory map of the RAM 46 of the mobile phone 10 shown in FIG. 11 and flowcharts for the processor 30 of the mobile phone 10 shown in FIG. 12-FIG. 14.

Figure 11:
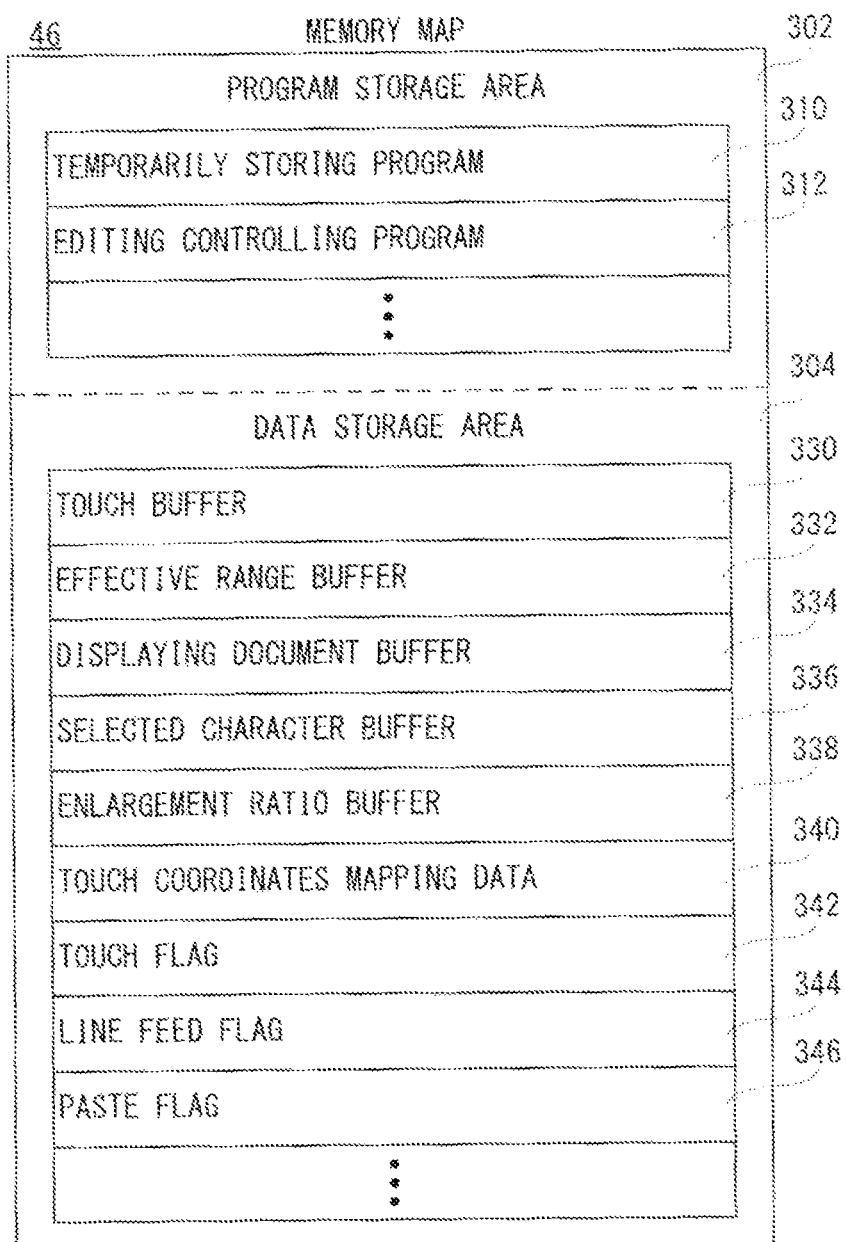
FIG. 11 is an illustrative view showing an example of a memory map of a RAM shown in FIG. 2.

With referring to FIG. 11, in the RAM 46 shown in FIG. 2, a program storage area 302 and a data storage area 304 are formed. The program storage area 302 is an area for storing (developing) a part or all of the program data set in advance in the flash memory 44 (FIG. 2) by reading the same from the flash memory 44 as aforementioned.

The program storage area 302 includes a temporarily storing program 310 for temporarily storing a selected character string, an editing controlling program 312 for arbitrarily changing a cursor position of the cursor CU and for performing each editing process, etc. In addition, the program storage area 302 also includes programs for performing a telephone function, a memo pad function, etc.

Next, the data storage area 304 of the RAM 46 is formed with a touch buffer 330, an effective range buffer 332, a displaying document buffer 334, a selected character buffer 336 and an enlargement ratio buffer 338, and stored with a touch coordinates map data 340. In the data storage area 304, a touch flag 342, a line feed flag 344 and a pasting flag 346 are also provided.

The touch buffer 330 is stored with data of touch coordinates that the touch panel control circuit 48 outputs. The effective range buffer 332 temporarily stores coordinate indicative of an effective range that is set based on a pinch out operation. The displaying document buffer 334 temporarily stores a character string read by the memo pad function. In the selected character buffer 336, a selected character for which "copying" or "cutting" is performed is temporarily stored. The enlargement ratio buffer 338 temporarily stores an enlargement ration calculated. In addition, "1.0 (same scale) is set in the enlargement ratio buffer 338 in an initial state.

The touch coordinates map data 340 is data for mapping touch coordinates by a touch operation and displaying coordinates on the display 14. That is, a result of the touch operation performed against the touch panel 16 is reflected in the displaying on the display 14 based on the touch coordinates map data 340.

The touch flag 342 is a flag for determining whether or not the touch panel 16 is touched. For example, the touch flag 342 is constructed by a 1-bit register. If the touch flag 342 is turned-on (truth), a data value "1" is set in the register, and if the touch flag 342 is turned-off (false), a data value "0" is set in the register. The touch flag 342 is switched between turning-on and turning-off based on a signal that the touch panel control circuit 48 outputs.

The line feed flag 344 is a flag for determining whether or not a setting is made such that a change of the cursor position and the line feed processing are to be performed. The pasting flag 346 is a flag for determining whether or not a setting is made such that a change of the cursor position and the pasting processing are to be performed. In addition, structure of each of these flags is approximately the same as the touch flag 342, and therefore, a detailed description of each of the flags will be omitted here.

In addition, the data storage area 304 further stores image data displayed in a standby state, data of character strings and so on, and is provided with counters and flags necessary for operating the mobile phone 10.

Figure 12:
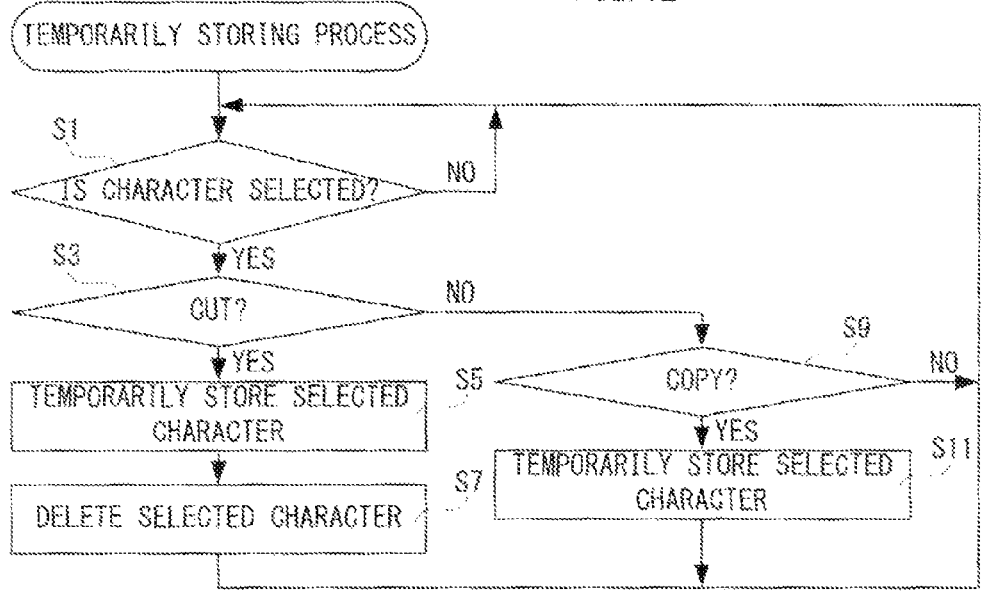
FIG. 12 is a flowchart showing an example of temporarily storing process by the processor shown in FIG. 2.
Figure 14:
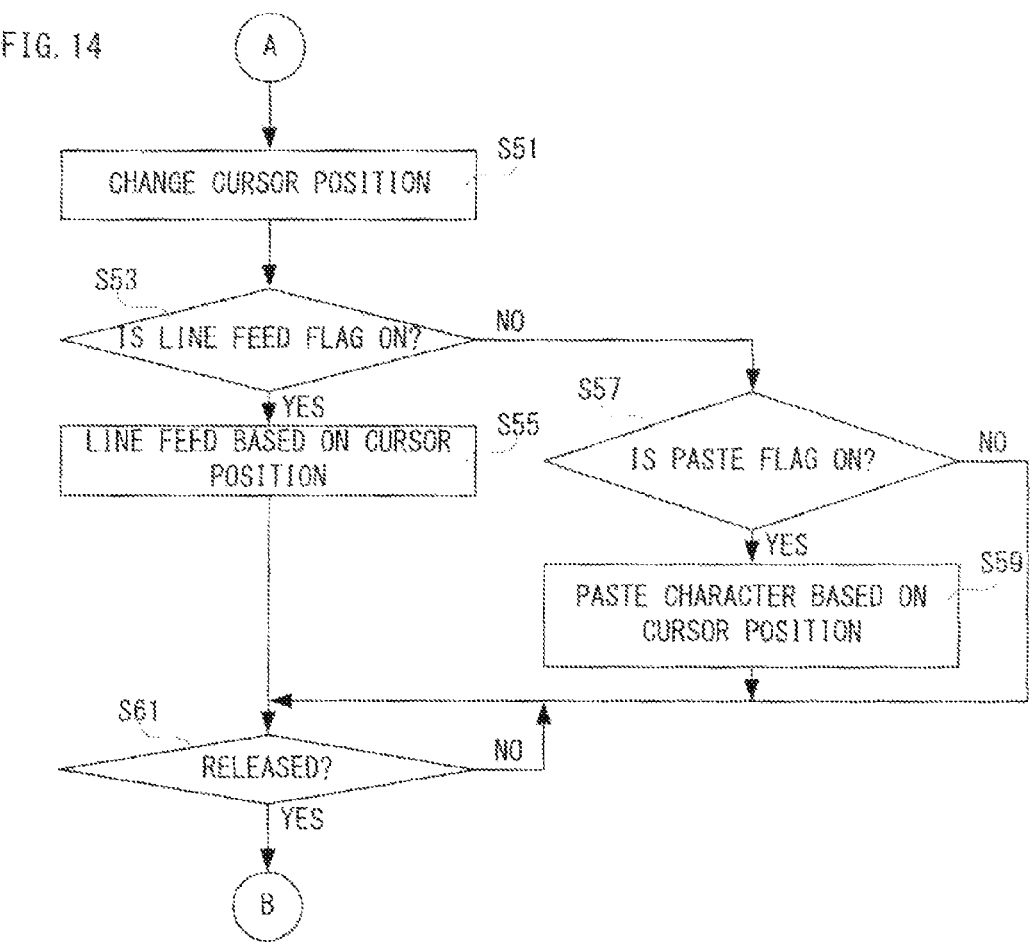
FIG. 14 is a flow chart showing an example of another part of the editing controlling process by the processor shown in FIG. 2, following FIG. 13.

The processor 30 processes a plurality of tasks including a temporarily storing process shown in FIG. 12, an editing controlling process shown in FIGS. 13 and 14, etc., in parallel with each other under controls of Linux (registered trademark)-base OS such as Android (registered trademark) and REX, or other OSs.

The temporarily storing process is started when the memo pad function is performed, for example. In a step S1, the processor 30 determines whether or not a character is selected. For example, the processor 30 determines whether or not a touch operation that a cursor position is a start position is performed. If "NO" is determined in the step S1, that is, if an operation for selecting a character is not performed, the processor 30 repeats the step S1.

If "YES" is determined in the step S1, that is, if a character is selected, in a step S3, the processor 30 determines whether or not the editing function is the cut. For example, it is determined whether or not the cut key 66 is operated. If "YES" is determined in the step S3, that is, if the cut key 66, for example, is operated, the processor 30 temporarily stores a selected character in a step S5. For example, a selected character being underlined as shown in FIG. 9 is temporarily stored in the selected character buffer 336. Subsequently, in a step S7, the processor 30 deletes the selected character. For example, in a state that a word (character string) "Please" is selected as shown in FIG. 9(B), the character string is deleted. In addition, if the processing in the step S7 is ended, the processor 30 make the key being displayed unshown and cancels the selection of the character, and then returns to the step S1.

If "NO" is determined in the step S3, that is, if the cut key 66 is not operated, for example, the processor 30 determines whether or not the editing function is the copy in a step S9. For example, it is determined whether or not the touch operation is performed on the copy key 64. If "YES" is determined in the step S9, that is, if the touch operation is performed on the copy key 64, for example, the processor 30 temporarily stores a selected character in the step S11, and returns to the step S1. On the other hand, if "NO" is determined in the step S9, that is, if no touch operation is performed on either key, the processor 30 makes the key being displayed unshown and cancels the selection of the character, and then returns to the step S1.

FIG. 13 and FIG. 14 are flowcharts of editing controlling process. When the memo pad function is performed, for example, the processor 30 displays a character and the cursor CU in a step S21. That is, a document (character) is displayed on the display 14 based on character data stored in the displaying document buffer 334. Furthermore, the cursor CU is displayed at a last position of the characters being displayed.

Subsequently, in a step S23, the processor 30 determines whether or not a pinch out operation is performed. That is, it is determined whether or not an operation for enlarging a displayed character is performed. More specifically, two touch positions at the same time or at approximately the same time are stored in the touch buffer 330, and it is determined whether or not the fingers are slidden such that two touch positions are apart from each other. If "NO" is determined in the step S23, that is, if it is not the pinch out operation, the processor 30 repeats the processing of the step S23.

On the other hand, if "YES" is determined in the step S23, that is, if the pinch out operation is performed, the processor 30 determines in a step S25, whether or not the enlargement ratio is a maximum value thereof. That is, it is determined whether or not the enlargement ratio read from the enlargement ratio buffer 338 reaches the maximum value thereof. If "YES" is determined in the step S25, that is, if the calculated enlargement ratio reaches the maximum value, the processor 30 proceeds to a step S29. If "NO" is determined in the step S25, that is, if the enlargement ratio does not reach the maximum value, the processor 30 calculates the enlargement ratio in accordance with a distance between the two points in a step S27. That is, the enlargement ratio is calculated based on a distance between the two touch positions being stored in the touch buffer 330. In addition, the calculated enlargement ratio is stored in the enlargement ratio buffer 338. In addition, the processor 30 performing the processing of the step S27 functions as a calculating module.

Next, in the step S29, the displaying is enlarged based on the enlargement ratio. That is, the processor 30 designates a range that the image data is to be read from the VRAM to the display driver 42 based on the enlargement ratio in the enlargement ratio buffer 338 and a center point between the two touch positions. As a result, an enlarged character is displayed on the display 14. In addition, the processor 30 performing the processing of the step S29 functions as an enlarging module.

Subsequently, in a step S31, it is determined whether or not the pinch out operation is ended. That is, the processor 30 determines whether or not the touch coordinates indicating the two touch positions being recorded in the touch buffer 330 becomes not to be changed. If "NO" is determined in the step S31, that is, if the pinch out operation is continued, for example, the processor 30 returns to the step S25. If "YES" is determined in the step S31, that is, if the pinch out operation is stopped, in a step S33, the processor 30 sets an effective range. That is, a region between the two touch positions being stored in the touch buffer 330 is set as the effective range. Then, coordinates indicative of the effective range are stored in the effective range buffer 332. In addition, the processor 30 performing the processing of the step S33 functions as a setting module.

Subsequently, it is determined whether or not the fingers are released in a step S35. For example, it is determined whether or not the two fingers are released, and the touch flag 342 is turned-off. If "YES" is determined in the step S35, that is, if all the fingers are released from the touch panel 16, the processor 30 undoes the displaying in the step S37, and returns to the step S23. That is, the processor 30 issues instructions to the display driver 42 to read the image data from the whole VRAM. In addition, the processor 30 performing the processing in the step S37 functions as an undoing module.

If "NO" is determined in the step S35, that is, if the two fingers continue to touch the touch panel 16, for example, the processor 30 determines whether or not a further touch operation is performed in a step S39. For example, it is determined whether or not a third finger touches the touch panel 16 as shown in FIG. 6. Specifically, the processor 30 determines whether or not coordinates representing a third touch position is stored in the touch buffer 330. In addition, the processor 30 performing the processing in the step S39 functions as a first determining module.

If "NO" is determined in the step S39, that is, if no additional touch operation is performed, the processor 30 returns to the step S25. On the other hand, if "YES" is determined in the step S39, that is, if the additional touch operation (further touch operation) is performed, the processor 30 determines whether or not a position of a further touch operation is within an effective range in a step S41. That is, the processor 30 determines whether or not the third touch position stored in the touch buffer 330 is included in a coordinates range of the effective range being recorded in the effective range buffer 332. In addition, the processor 30 performing the processing in the step S41 functions as a second determining module.

If "NO" is determined in the step S41, that is, if the position of the additional touch operation is not within the effective range, the process returns to the step S25. If "YES" is determined in the step S41, that is, if the position of the additional touch operation is within the effective range, in a step S51 in FIG. 14, the processor 30 changes the cursor position. That is, the position that the cursor CU is to be displayed is changed based on the third touch position being stored in the touch buffer 330. In addition, the processor 30 performing the processing of the step S51 functions as a changing module.

Succeedingly, the processor 30 determines whether or not the line feed flag 344 is turned-on in a step S53. That is, it is determined whether or not a setting is made such that a line feed processing and a change in the cursor position are performed. If "YES" is determined in the step S53, that is, if the setting is made such that a line feed processing and a change in the cursor position are performed, the processor 30 starts a new line based on the cursor position in a step S55, and then proceeds to a step S61. For example, as shown in FIG. 8(A), a character just after the cursor CU starts a new line.

On the other hand, if "NO" is determined in the step S53, that is, if a setting that the line feed processing is to be performed is not made, in a step S57, the processor 30 determines whether or not the paste flag 346 is turned-on. That is, it is determined whether or not a setting that a change of the cursor position and the paste processing are to be performed is made. If "YES" is determined in the step S57, that is, if the setting that the paste processing is to be performed is made, the processor 30 pastes a character based on the cursor position in a step S59, and then proceeds to the step S61. For example, the processor 30 reads a character from the selected character buffer 336, and inserts a read character before the cursor CU. If "NO" is determined in the step S57, that is, if no setting is made, the processor 30 proceeds to the step S61. In addition, the processor 30 performing the processing in the steps S55 and S59 functions as a performing module.

Subsequently, the processor 30 determines whether or not the fingers are released in the step S61. That is, it is determined whether or not all fingers are released from the touch panel 16 and the touch flag 342 is turned-off. If "NO" is determined in the step S61, that is, if the fingers are not released, the processor 30 repeats the processing in the step S61. In contrast, if "YES" is determined in the step S61, that is, if the fingers are released, the processor 30 returns to the step S37 (FIG. 13).

In addition, in other embodiments, the read character may be inserted after the cursor CU. In such a case, the character is inserted and then, the cursor position of the cursor CU is changed after the inserted character.

Second Embodiment

In the second embodiment, after the cursor position is changed, the editing processing can be selected. In addition, since a mobile phone 10 according to the second embodiment is the same or approximately the same as that of the first embodiment, descriptions of the electrical structure and the appearance of the mobile phone 10 and the memory map of the RAM 46 and the editing controlling process shown in FIG. 13 are omitted here.

Figure 15:
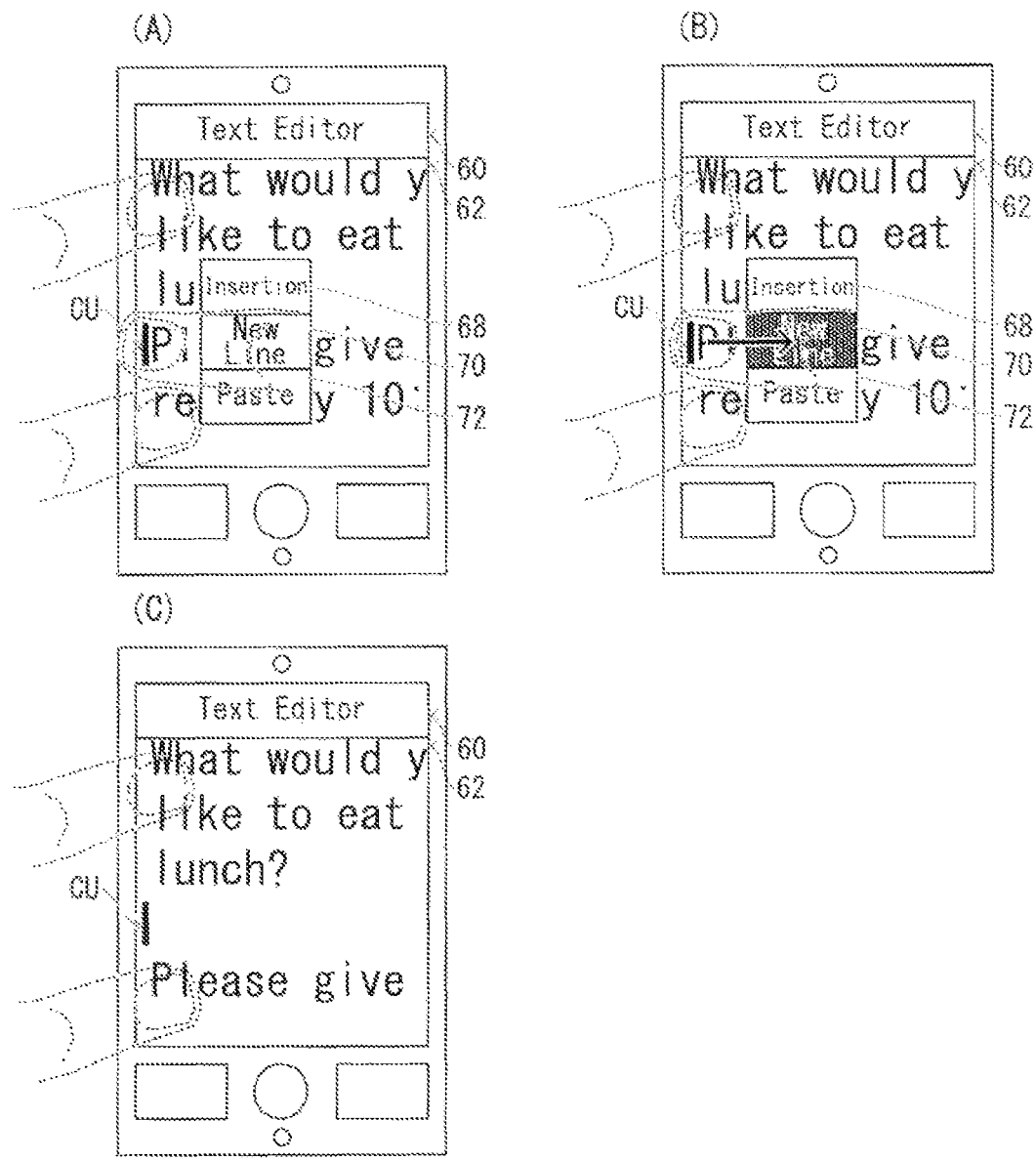

With referring to FIG. 15(A), when an additional touch operation (a further touch operation) is performed at an arbitrary position in a state that the character is enlarged, the cursor position is changed to the touch position by the additional touch operation, and a plurality of editing keys are displayed around the touch position. The plurality of editing keys include an insert key 68 for inserting the cursor CU at the touch position, a line feed key 70 for inserting the cursor CU at the touch position and starting a new line and a paste key 72 for pasting a character at the touch position.

The insert key 68, the line feed key 70 and the paste key 72 can be selected according to a direction of an operation that a finger is flipped from the touch position (hereinafter, called as "flick operation"). More specifically, the insert key 68 corresponds to a flick operation in an upward direction, the line feed key 70 corresponds to a flick operation in a horizontal direction and the paste key 72 corresponds to a flick operation in a downward direction. For example, as shown in FIG. 15(B), if a flick operation in the horizontal direction is performed by a third finger, the line feed key 70 is selected, and therefore, as shown in FIG. 15(C), the character after the cursor CU starts a new line.

Although not shown, if a flick operation in the upward direction is performed, the cursor CU is inserted at a first touch position. That is, it becomes a state that a displaying of a plurality of editing keys is made unshown. If a flick operation is performed in the downward direction, the selected character stored in the RAM 46 is pasted before the cursor CU. However, if no selected character is stored, no character is pasted before the cursor CU.

Thus, in the second embodiment, it is possible to insert the cursor CU and to easily select the editing processing.

In addition, the plurality of editing keys may include a key which corresponds to another editing operation. Furthermore, in other embodiments, the plurality of editing keys may be independently arranged such that it is easy to select by a flick operation. Furthermore, the insert key 68, the line feed key 70 and the paste key 72 may be selected with other touch operations but not the flick operation.

Figure 16:
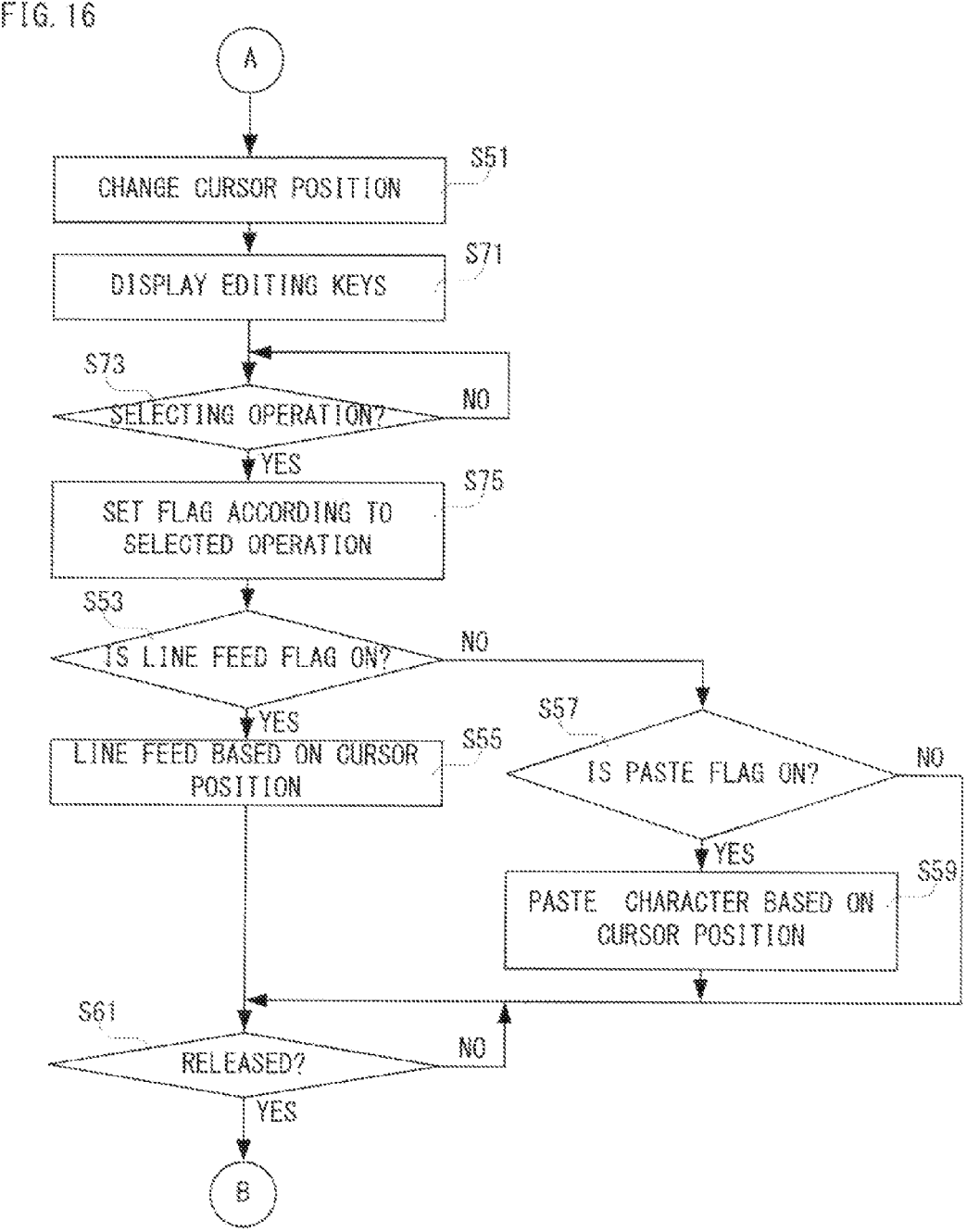
FIG. 16 is a flowchart showing an example of a part of an editing controlling process by the processor shown in FIG. 2 in accordance with a second embodiment, following FIG. 13.

FIG. 16 is a flowchart of a part of the editing controlling process according to the second embodiment. In addition, since the steps S21-S41 are the same as those of the editing controlling processing according to the first embodiment, and therefore, illustrations and a description therefor are omitted.

If the additional touch operation (further touch operation) is within the effective range and "YES" is determined in the step S41, the processor 30 changes the cursor position in a step S51. Subsequently, in a step S71, the processor 30 displays the editing keys. For example, as shown in FIG. 15(A), the insert key 68, the line feed key 70 and the paste key 72 are displayed based on the third touch position. Then, the processor 30 determines whether or not a selecting operation is performed in a step S73. That is, the processor 30 determines whether or not a flick operation is performed based on an output of the touch panel control circuit 48. Next, in a step S75, the processor 30 sets a flag according to the selecting operation. For example, if the line feed key 70 is selected by the flick operation in the horizontal direction, the line feed flag 344 is turned-on. If the paste key 72 is selected by the flick operation in the downward direction, the paste flag 346 is turned-on. If the insert key 68 is selected by the flick operation in the upward direction, the line feed flag 344 and the paste flag 346 are turned-off. If the processing in the step S75 is ended, the editing keys are made unshown.

Subsequently, in a step S53, the processor 30 determines whether or not the line feed flag 344 is turned-on. If "YES" is determined in the step S53, that is, if the line feed key 70 is selected by the flick operation in the horizontal direction, for example, the processor 30 performs a line feed operation based on the cursor position in the step S55, and then proceeds to the step S61. If "NO" is determined in the step S53, the processor 30 determines whether or not the paste flag 346 is turned-on in the step S57. If "YES" is determined in the step S57, that is, if the paste key 72 is selected by the flick operation in the downward direction, for example, the processor 30 pastes a character based on the cursor position in the step S59, and then proceeds to the step S61.

Furthermore, if "NO" is determined in the step S57, that is, if the insert key 68 is selected by the flick operation in the upward direction and thus the line feed flag 344 and the paste flag 346 are turned-off, the processor 30 proceeds to the step S61 with no operation.

Then, in the step S61, it is determined whether or not the finger is released from the touch panel 16. If "NO" is determined in the step S61, that is, if the finger is not released, the processor 30 repeats the processing in the step S61. If "YES" is determined in the step S61, that is, the finger is released from the touch panel 16, the process returns to the step S37 (FIG. 13).

In addition, in a case that the displaying of the display 14 is to be enlarged, in other embodiments, the image data which is subjected in advance to enlargement processing may be output to the display driver 42 from the processor 30. More specifically, the processor 30 extracts the image data to be enlarged, based on the center in the pinch out operation and the enlargement ratio, from the image data to be output to the display driver 42, and then, with respect to the extracted image data, the enlargement processing is applied such that the extracted image data becomes a size corresponding to the character displaying area 62, and the enlarged image data is output to the display driver 42, whereby the character (image) having been enlarged in advance is displayed in the character displaying area 62. In addition, in a case that the displaying is to be undone, the image data before extracted is output to the display driver 42.

In addition, in other embodiments, an enlarging displaying range that is enlarged by the pinch out operation may be set as an effective range. For example, in a case that the predetermined condition is a condition whether or not the touch operation is performed within such an enlarging displaying range, the user can change the cursor position to an arbitrary position in the displaying that is enlarged by the pinch out operation.

Furthermore, in the embodiments, a change of the cursor position in the memo pad function is described, but the embodiments can be applied to, other than the memo pad function, a mail function, an SMS function, an address book function, a browsing function, etc., if such a function is a function that the cursor CU is displayed at a time that a character string is to be input.

Programs utilized in the above-described embodiments may be stored in a HDD of the server for data distribution, and distributed to the mobile phone 10 via the network. The plurality of programs may be stored in a storage medium such as an optical disk of CD, DVD, BD (Blu-ray Disc) or the like, a USB memory, a memory card, etc. and then, such the storage medium may be sold or distributed. In a case that the plurality of programs downloaded via the above-described server or storage medium are installed to a mobile terminal having the structure equal to the structure of the embodiment, it is possible to obtain advantages equal to advantages according to the embodiment.

The specific numerical values mentioned in this specification are only examples, and changeable properly in accordance with the change of product specifications.

It should be noted that reference numerals and the supplements inside the parentheses show an example of a corresponding relationship with the embodiments described for easy understanding of the present invention, and do not limit the present invention.

An embodiment is a mobile terminal having a display which displays a cursor, a touch panel provided on the display and a detecting module which detects a touch operation with respect to the touch panel, comprising: a calculating module which calculates an enlargement ratio according to an enlarging operation in a state that the enlarging operation is being performed with respect to the touch panel; an enlarging module which enlarges a displaying by the display based on the enlargement ratio; a first determining module which determines whether or not a further touch operation is performed in a state that the displaying by the display is being enlarged; a second determining module which determines whether or not the further touch operation satisfies a predetermined condition when it is determined by the first determining module that the further touch operation is performed; and a changing module which changes a cursor position of the cursor in response to the further touch operation satisfying the predetermined condition when it is determined that the further touch operation satisfying the predetermined condition is performed.

In the embodiment, the mobile terminal (10: reference numeral exemplifying a module corresponding in the embodiment, and so forth.) includes the display (14) which displays the cursor (CU) indicative of a character and an editing position, for example, etc. The touch panel (16) which functions as a pointing device is provided on the display. Then, a touch operation with respect to the touch panel is detected by the detecting module (48).

The calculating module (30, S27) calculates, during a time period that a pinch out operation is being operated by two fingers, an enlargement ratio in accordance with a change of a distance between two points indicated by the two fingers. The enlarging module (30, S29) enlarges a displaying by the display when the enlargement ratio is calculated. Therefore, on the display, an enlarged character, for example is displayed. The first determining module (30, S39) determines whether or not an additional touch operation (further touch operation) is performed by a third finger, for example in a state that the displaying is being enlarged according to the enlarging operation. The second determining module (30, S41) determines whether the further touch operation satisfies a predetermined condition if the further touch operation is performed by the third finger. The changing module (30, S51) changes a cursor position in response to the further touch operation if the further touch operation by the third finger satisfies the predetermined condition.

According to the embodiment, it is possible for a user to enlarge the character and to easily change the cursor position by performing an enlarging operation. Therefore, it becomes easy for the user to edit the character.

Another embodiment is a mobile terminal further comprising an undoing module which undoes the displaying by the display when the touch operation with respect to the touch panel becomes not to be detected in a state that the displaying of the display ie being enlarged.

In this embodiment, the undoing module (30, S37) undoes the displaying by the display if the finger is released from the touch panel, for example, in a state that the displaying by the display is being enlarged by the enlarging module.

According to this embodiment, the user can confirm a whole document by releasing the finger, for example.

A further embodiment is a mobile terminal further comprising a performing module which performs editing processing based on the cursor position changed by the changing module.

In the further embodiment, the performing module (30, S55, S59) performs the editing processing based on the cursor position after changed if the cursor position is changed by the further touch operation.

According to the further embodiment, the user can change the cursor position and edit the document.

A still further embodiment is a mobile terminal, wherein the editing processing includes line feeding processing and pasting processing as a kind of processing, and further comprises a selecting module which selects the kind of processing when the cursor position is changed by the changing module.

In the still further embodiment, the editing processing includes line feeding processing that a new line is started by the character after the cursor and pasting processing that a character being stored is pasted, as a kind of processing. Selecting module (30, S71, S73) displays keys (60, 70, 72) corresponding to the line feeding processing and the pasting processing such that the kind of processing can be selected in accordance with a selection result of the keys.

According to the still further embodiment, it is possible to insert a cursor and to easily select the kind of processing.

Another further embodiment is a mobile terminal, wherein the enlarging operation includes a pinch out operation and the predetermined condition includes a condition whether or not the touch operation is performed within an effective range, and further comprises a setting module which sets the effective range based on positions of two points when the positions of the two points by the pinch out operation become not to be changed, wherein the second determining module determines whether or not the further touch operation determined by the first determining module is included in the effective range.

In the embodiment, the enlarging operation includes a pinch out operation performed by two fingers, and the predetermined condition includes a condition whether or not the touch operation is performed within an effective range. The setting module (30, S33) sets an area between the two fingers as the effective range if and when the positions of the two points become not to be changed by stopping movement of the fingers by the user, for example. Then, the second determining module determines whether or not the position that the third finger touches the touch panel, for example is within the effective range.

According to the embodiment, it is possible to make the cursor position not changed to a position that the user does not intend.

A still another embodiment is an editing controlling method of a mobile terminal (10) having a display (14) which displays a cursor (CU), a touch panel (16) provided on the display and a detecting module which detects a touch operation with respect to the touch panel, comprising steps of: calculating (S27) an enlargement ratio according to an enlarging operation in a state that the enlarging operation is performed with respect to the touch panel; enlarging (S29) a displaying by the display based on the enlargement ratio; determining (S39) whether or not a further touch operation is performed in a state that the displaying is being enlarged; determining (S41) whether or not the further touch operation satisfies a predetermined condition when it is determined that the further touch operation is performed; and changing (S51) a cursor position of the cursor in response to the further touch operation satisfying the predetermined condition when it is determined that the further touch operation satisfying the predetermined condition is made.

According to this embodiment as well, the user can enlarge the character and easily change the cursor position with the enlargement operation, and therefore, it becomes easy for the user to perform editing a character.

The other embodiment is a mobile terminal (10) having a display (14) which displays a cursor (CU), a touch panel (16) provided on the display and a detecting module (48) which detects a touch operation with respect to the touch panel, comprising: a calculating module (30, S27) which calculates an enlargement ratio according to an enlarging operation in a state that the enlarging operation is performed with respect to the touch panel; an enlarging module (30, S29) which enlarges a displaying by the display based on the enlargement ratio; and an undoing module (30, S37) which undoes the displaying by the display when the touch operation with respect to the touch panel becomes not to be detected in a state that the displaying by the display is being enlarged.

According to the other embodiment, the user can undo the displaying only by releasing the finger after the displaying is enlarged Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mobile terminal having a display which displays a cursor, a touch panel provided on the display, and a detecting module which detects a touch operation with respect to the touch panel, the mobile terminal comprising:
   a calculating module which calculates an enlargement ratio according to an enlarging operation in a state that the enlarging operation is being performed with respect to the touch panel;
   an enlarging module which enlarges a displaying by the display based on the enlargement ratio;
   a setting module which sets an effective range for the enlarging operation based on positions of two points of the enlarging operation;
   a first determining module which determines whether or not a further touch operation is performed in a state that the displaying by the display is enlarged;
   a second determining module which determines whether or not the further touch operation is performed within the effective range when it is determined by the first determining module that the further touch operation is performed; and
   a changing module which changes a cursor position of the cursor in response to the further touch operation when it is determined that the further touch operation has been performed within the effective range.

2. A mobile terminal according to claim 1, further comprising an undoing module which undoes the enlarging of the displaying by the display when one or both of the enlarging operation and further touch operation are ended.

3. A mobile terminal according to claim 1, further comprising a performing module which performs an editing processing based on the cursor position changed by the changing module.

4. A mobile terminal according to claim 3, further comprising a selecting module which selects a kind of editing processing from a plurality of kinds of editing processing when the cursor position is changed by the changing module, wherein the plurality of kinds of editing processing comprise line-feed processing and pasting processing.

5. A mobile terminal according to claim 1, wherein the enlarging operation includes a pinch out operation.

6. An editing controlling method of a mobile terminal having a display which displays a cursor, a touch panel provided on the display, and a detecting module which detects a touch operation with respect to the touch panel, the method comprising:
   calculating an enlargement ratio according to an enlarging operation in a state that the enlarging operation is performed with respect to the touch panel;
   enlarging a displaying by the display based on the enlargement ratio;
   setting an effective range for the enlarging operation based on positions of two points of the enlarging operation;
   determining whether or not a further touch operation is performed in a state that the displaying is enlarged;
   determining whether or not the further touch operation is performed within the effective range when it is determined that the further touch operation is performed; and
   changing a cursor position of the cursor in response to the further touch operation when it is determined that the further touch operation has been performed within the effective range.

7. A mobile terminal having a display and a touch panel provided on the display, the mobile terminal comprising one or more modules that:
- detect a first touch operation on the touch panel, wherein the first touch operation comprises two touch points spreading apart;
- calculating an enlargement ratio based on a distance between the two touch points of the first touch operation;
- enlarging information displayed on the display based on the enlargement ratio;
- detecting a second touch operation comprising a touch point within a range between the two touch points of the first touch operation; and,
- in response to the second touch operation, changing a position of a cursor, within the information displayed on the display, based on the touch point of the second touch operation.

\* \* \* \* \*